(12) United States Patent
Bodin et al.

(10) Patent No.: US 7,831,432 B2
(45) Date of Patent: Nov. 9, 2010

(54) AUDIO MENUS DESCRIBING MEDIA CONTENTS OF MEDIA PLAYERS

(75) Inventors: William K. Bodin, Austin, TX (US); David Jaramillo, Lake Worth, FL (US); Jerry W. Redman, Cedar Park, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 11/536,781

(22) Filed: Sep. 29, 2006

(65) Prior Publication Data

US 2008/0082576 A1 Apr. 3, 2008

(51) Int. Cl.
*G10L 15/00* (2006.01)

(52) U.S. Cl. .................. 704/275; 704/260; 715/728; 715/729

(58) Field of Classification Search .............. 704/260, 704/275; 715/728, 729
See application file for complete search history.

(56) References Cited

U.S. PATENT DOCUMENTS

| | | | |
|---|---|---|---|
| 5,819,220 A | 10/1998 | Sarukkai et al. | |
| 6,032,260 A | 2/2000 | Sasmazel et al. | |
| 6,178,511 B1 | 1/2001 | Cohen et al. | |
| 6,240,391 B1 | 5/2001 | Ball et al. | |
| 6,266,649 B1 | 7/2001 | Linden et al. | |
| 6,311,194 B1 | 10/2001 | Sheth et al. | |
| 6,771,743 B1 | 8/2004 | Butler et al. | |
| 6,944,591 B1 | 9/2005 | Raghunandan | |
| 6,976,082 B1 | 12/2005 | Ostermann et al. | |
| 6,993,476 B1 | 1/2006 | Dutta et al. | |
| 7,039,643 B2 | 5/2006 | Sena et al. | |
| 7,062,437 B2 | 6/2006 | Kovales et al. | |
| 7,130,850 B2 | 10/2006 | Russell-Falla et al. | |
| 7,171,411 B1 | 1/2007 | Lewis et al. | |
| 7,356,470 B2 | 4/2008 | Roth et al. | |
| 7,454,346 B1 | 11/2008 | Dodrill et al. | |
| 2001/0027396 A1 | 10/2001 | Sato | |
| 2001/0047349 A1 | 11/2001 | Easty et al. | |
| 2001/0049725 A1 | 12/2001 | Kosuge | |

(Continued)

FOREIGN PATENT DOCUMENTS

WO WO 0182139 11/2001

(Continued)

OTHER PUBLICATIONS

Text to Speech MP3 with Natural Voices 1.71, Published Oct. 5, 2004.

(Continued)

*Primary Examiner*—Daniel D Abebe
(74) *Attorney, Agent, or Firm*—H. Barrett Spraggins; Matthew Talpis; Biggers & Ohanian, LLP

(57) ABSTRACT

Methods, systems, and computer program products are provided for creating an audio menu describing media content of a media player. Embodiments include retrieving metadata describing the media files managed by the media player; converting at least a portion of the metadata to speech; creating one or more media files for the audio menu; and saving the speech in the audio portion of the one or more the media files for the audio menu.

12 Claims, 6 Drawing Sheets

U.S. PATENT DOCUMENTS

| | | |
|---|---|---|
| 2001/0054074 A1 | 12/2001 | Hayashi |
| 2002/0013708 A1 | 1/2002 | Walker et al. |
| 2002/0032564 A1 | 3/2002 | Ehsani et al. |
| 2002/0032776 A1 | 3/2002 | Hasegawa et al. |
| 2002/0054090 A1 | 5/2002 | Silva et al. |
| 2002/0062216 A1 | 5/2002 | Guenther et al. |
| 2002/0062393 A1 | 5/2002 | Borger et al. |
| 2002/0095292 A1 | 7/2002 | Mittal et al. |
| 2002/0152210 A1 | 10/2002 | Johnson et al. |
| 2002/0178007 A1 | 11/2002 | Slotznick et al. |
| 2002/0194286 A1 | 12/2002 | Matsuura et al. |
| 2002/0198720 A1 | 12/2002 | Takagi et al. |
| 2003/0028380 A1 | 2/2003 | Freeland et al. |
| 2003/0033331 A1 | 2/2003 | Sena et al. |
| 2003/0055868 A1 | 3/2003 | Fletcher et al. |
| 2003/0103606 A1 | 6/2003 | Rhie et al. |
| 2003/0110272 A1 | 6/2003 | du Castel et al. |
| 2003/0110297 A1 | 6/2003 | Tabatabai et al. |
| 2003/0115056 A1 | 6/2003 | Gusler et al. |
| 2003/0115064 A1 | 6/2003 | Gusler et al. |
| 2003/0126293 A1 | 7/2003 | Bushey |
| 2003/0158737 A1 | 8/2003 | Csicsatka |
| 2003/0160770 A1 | 8/2003 | Zimmerman |
| 2003/0167234 A1 | 9/2003 | Bodmer et al. |
| 2003/0172066 A1 | 9/2003 | Cooper et al. |
| 2004/0003394 A1 | 1/2004 | Ramaswamy |
| 2004/0041835 A1 | 3/2004 | Lu |
| 2004/0068552 A1 | 4/2004 | Kotz et al. |
| 2004/0088349 A1 | 5/2004 | Beck et al. |
| 2004/0199375 A1 | 10/2004 | Ehsani et al. |
| 2004/0201609 A1 | 10/2004 | Obrador |
| 2004/0254851 A1 | 12/2004 | Himeno et al. |
| 2005/0015254 A1 * | 1/2005 | Beaman .................. 704/270.1 |
| 2005/0045373 A1 * | 3/2005 | Born ......................... 174/254 |
| 2005/0071780 A1 | 3/2005 | Muller et al. |
| 2005/0076365 A1 | 4/2005 | Popov et al. |
| 2005/0108521 A1 | 5/2005 | Silhavy et al. |
| 2005/0232242 A1 | 10/2005 | Karaoguz et al. |
| 2006/0008258 A1 | 1/2006 | Kawana et al. |
| 2006/0020662 A1 | 1/2006 | Robinson |
| 2006/0048212 A1 | 3/2006 | Tsuruoka et al. |
| 2006/0050794 A1 * | 3/2006 | Tan et al. ................ 375/240.26 |
| 2006/0052089 A1 | 3/2006 | Khurana et al. |
| 2006/0075224 A1 | 4/2006 | Tao |
| 2006/0095848 A1 | 5/2006 | Naik |
| 2006/0123082 A1 | 6/2006 | Digate et al. |
| 2006/0136449 A1 | 6/2006 | Parker et al. |
| 2006/0140360 A1 | 6/2006 | Crago et al. |
| 2006/0155698 A1 | 7/2006 | Vayssiere |
| 2006/0159109 A1 | 7/2006 | Lamkin et al. |
| 2006/0173985 A1 | 8/2006 | Moore |
| 2006/0184679 A1 | 8/2006 | Izdepski et al. |
| 2006/0190616 A1 | 8/2006 | Mayerhofer et al. |
| 2006/0224739 A1 | 10/2006 | Anantha |
| 2006/0233327 A1 | 10/2006 | Roberts et al. |
| 2006/0265503 A1 | 11/2006 | Jones et al. |
| 2006/0288011 A1 | 12/2006 | Gandhi et al. |
| 2007/0027958 A1 | 2/2007 | Haslam |
| 2007/0061266 A1 | 3/2007 | Moore et al. |
| 2007/0073728 A1 | 3/2007 | Klein et al. |
| 2007/0083540 A1 | 4/2007 | Gundia et al. |
| 2007/0091206 A1 | 4/2007 | Bloebaum |
| 2007/0100836 A1 | 5/2007 | Eichstaedt et al. |
| 2007/0112844 A1 | 5/2007 | Tribble et al. |
| 2007/0118426 A1 | 5/2007 | Barnes, Jr. |
| 2007/0124458 A1 | 5/2007 | Kumar |
| 2007/0124802 A1 | 5/2007 | Anton et al. |
| 2007/0130589 A1 | 6/2007 | Davis et al. |
| 2007/0174326 A1 | 7/2007 | Schwartz et al. |
| 2007/0191008 A1 | 8/2007 | Bucher et al. |
| 2007/0192327 A1 | 8/2007 | Bodin |
| 2007/0192674 A1 | 8/2007 | Bodin |
| 2007/0192683 A1 | 8/2007 | Bodin |
| 2007/0192684 A1 | 8/2007 | Bodin et al. |
| 2007/0208687 A1 * | 9/2007 | O'Conor et al. ................. 707/1 |
| 2007/0213857 A1 | 9/2007 | Bodin |
| 2007/0213986 A1 | 9/2007 | Bodin |
| 2007/0214147 A1 | 9/2007 | Bodin et al. |
| 2007/0214148 A1 | 9/2007 | Bodin |
| 2007/0214149 A1 | 9/2007 | Bodin |
| 2007/0214485 A1 | 9/2007 | Bodin |
| 2007/0220024 A1 | 9/2007 | Putterman et al. |
| 2007/0253699 A1 | 11/2007 | Yen et al. |
| 2007/0276837 A1 | 11/2007 | Bodin et al. |
| 2007/0276865 A1 | 11/2007 | Bodin et al. |
| 2007/0276866 A1 | 11/2007 | Bodin et al. |
| 2007/0277088 A1 | 11/2007 | Bodin |
| 2007/0277233 A1 | 11/2007 | Bodin |
| 2008/0034278 A1 | 2/2008 | Tsou et al. |
| 2008/0052415 A1 | 2/2008 | Kellerman et al. |
| 2008/0082576 A1 | 4/2008 | Bodin |
| 2008/0082635 A1 | 4/2008 | Bodin |
| 2008/0161948 A1 | 7/2008 | Bodin |
| 2008/0162131 A1 | 7/2008 | Bodin |
| 2008/0275893 A1 | 11/2008 | Bodin et al. |

FOREIGN PATENT DOCUMENTS

| | | |
|---|---|---|
| WO | WO 2005/106846 | 11/2005 |

OTHER PUBLICATIONS

Managing multimedia content and delivering services across multiple client platforms using XML, London Communications Symposium, xx, xx, Sep. 10, 2002, pp. 1-7.

PCT Search Report and Written Opinion International Application PCT/EP2007/050594.

Adapting Multimedia Internet Content for Universal Access, Rakesh Mohan, John R. Smith, Chung-Sheng Li, IEEE Transactions on Multimedia vol. 1, No. 1, p. 104-p. 144.

Office Action Dated May 24, 2006 in U.S. Appl. No. 11/420,018.
Office Action Dated Sep. 29, 2006 in U.S. Appl. No. 11/536,733.
Office Action Dated Jan. 3, 2007 in U.S. Appl. No. 11/619,253.
Office Action Dated May 24, 2006 in U.S. Appl. No. 11/420,016.
Office Action Dated May 24, 2006 in U.S. Appl. No. 11/420,015.
Office Action Dated Mar. 9, 2006 in U.S. Appl. No. 11/372,318.
Office Action Dated Mar. 9, 2006 in U.S. Appl. No. 11/372,329.
Office Action Dated Mar. 9, 2006 in U.S. Appl. No. 11/372,325.
Office Action Dated Mar. 9, 2006 in U.S. Appl. No. 11/372,323.
Office Action Dated Feb. 13, 2006 in U.S. Appl. No. 11/352,679.
Office Action Dated Feb. 13, 2006 in U.S. Appl. No. 11/352,824.
Office Action Dated Feb. 13, 2006 in U.S. Appl. No. 11/352,760.
Office Action Dated Jun. 23, 2009 in U.S. Appl. No. 11/352,680.
Office Action Dated Jul. 8, 2009 in U.S. Appl. No. 11/372,317.
Final Office Action Dated Jul. 22, 2009 in U.S. Appl. No. 11/536,733.
Office Action Dated Jul. 9, 2009 in U.S. Appl. No. 11/420,017.
Office Action Dated Jul. 17, 2009 in U.S. Appl. No. 11/536,781.
Office Action Dated Jul. 23, 2009 in U.S. Appl. No. 11/420,014.
Final Office Action Dated Jul. 21, 2009 in U.S. Appl. No. 11/420,018.

* cited by examiner

AUDIO MENUS DESCRIBING MEDIA CONTENTS OF MEDIA PLAYERS

BACKGROUND OF THE INVENTION

1. Field of the Invention

The field of the invention is data processing, or, more specifically, methods, systems, and products for creating an audio menu describing media content of a media player.

2. Description of Related Art

Portable media players are often lightweight making such players user friendly and popular. Many conventional portable media players include display screens for displaying metadata associated with the media files supported by the portable media players in addition to being capable of playing the media files themselves. To read the metadata from the display screen users must either be able to see or be in a position to look at the display screen of the portable media player. Blind users and users who are currently visually occupied cannot use the display screen to read the metadata associated with the media files supported by the portable media player.

SUMMARY OF THE INVENTION

Methods, systems, and computer program products are provided for creating an audio menu describing media content of a media player. Embodiments include retrieving metadata describing the media files managed by the media player; converting at least a portion of the metadata to speech; creating one or more media files for the audio menu; and saving the speech in the audio portion of the one or more the media files for the audio menu.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
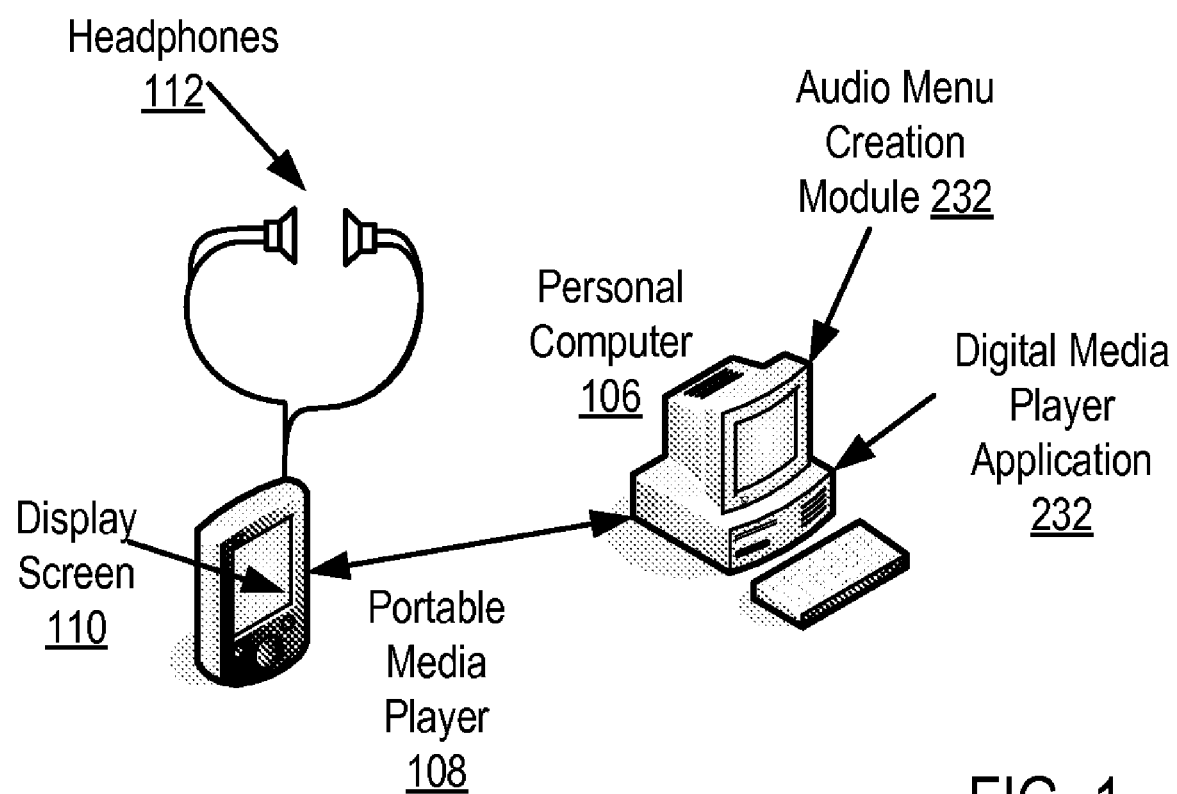
FIG. 1 sets forth a block diagram of an exemplary system for creating an audio menu describing media content of a media player according to the present invention.

Exemplary methods, systems, and products for creating audio menus describing media contents of media players are described with reference to the accompanying drawings, beginning with FIG. 1. FIG. 1 sets forth a block diagram of an exemplary system for creating an audio menu describing media content of a media player according to the present invention. The system of FIG. 1 includes a personal computer (106) having installed upon it a digital media player application (232) and an audio menu creation module (454). A digital media player application (234) is an application that manages media content in media files such as audio files and video files. Such digital media player applications are typically capable of storing the media files on a portable media player. Examples of digital media player applications include Music Match™, iTunes®, Songbird™ and others as will occur to those of skill in the art.

The audio menu creation module (232) is an application for creating an audio menu describing media content of a media player according to the present invention, including computer program instructions for retrieving metadata describing the media files managed by the media player; converting at least a portion of the metadata to speech; creating one or more media files for the audio menu; and saving the speech in the audio portion of the one or more the media files for the audio menu. The digital media player application (232) is capable of transferring the one or more media files having the speech of the metadata describing the other media files managed by the media player to a portable media player (108).

A portable media player (108) is a device capable of rendering media files and other content. Examples of portable media players include the iPod® from Apple and Creative Zen Vision from Creative labs. The portable media player (108) of FIG. 1 includes a display screen (110) for rendering video content and visually rendering metadata describing media files stored on the portable media player (108). The portable media player (108) of FIG. 1 also includes headphones (112) for rendering audio content of media files stored on the portable media player.

The arrangement of devices making up the exemplary system illustrated in FIG. 1 is for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Creating an audio menu describing media content of a media player according to the present invention is generally implemented with computers, that is, with automated computing machinery. In the system of FIG. 1, for example, all the devices are implemented to some extent at least as computers. For further explanation, therefore, FIG. 2 sets forth a block diagram of automated computing machinery comprising a computer useful in creating an audio menu describing media content of a media player according to the present invention. The computer (114) of FIG. 2 includes at least one computer processor (156) or 'CPU' as well as random access memory (168) ('RAM') which is connected through a system bus (160) to a processor (156) and to other components of the computer (114).

Stored in RAM (168) is a digital media player application (234). As mentioned above, a digital media player application (234) is an application that manages media content in media files such as audio files and video files. Such digital media player applications are typically capable of storing the managed media files on a portable media player. Examples of digital media player applications include Music Match™, iTunes®, Songbird™ and others as will occur to those of skill in the art.

Also stored in RAM (168) The audio menu creation module (232) is an application for creating an audio menu describing media content of a media player according to the present invention, including computer program instructions for retrieving metadata describing the media files managed by the media player; converting at least a portion of the metadata to speech; creating one or more media files for the audio menu; and saving the speech in the audio portion of the one or more the media files for the audio menu.

Also stored in RAM (168) is an operating system (154). Operating systems useful in computers according to embodiments of the present invention include UNIX™, Linux™, Microsoft Windows NT™, AIX™, IBM's i5/OS™, and others as will occur to those of skill in the art.

Figure 2:
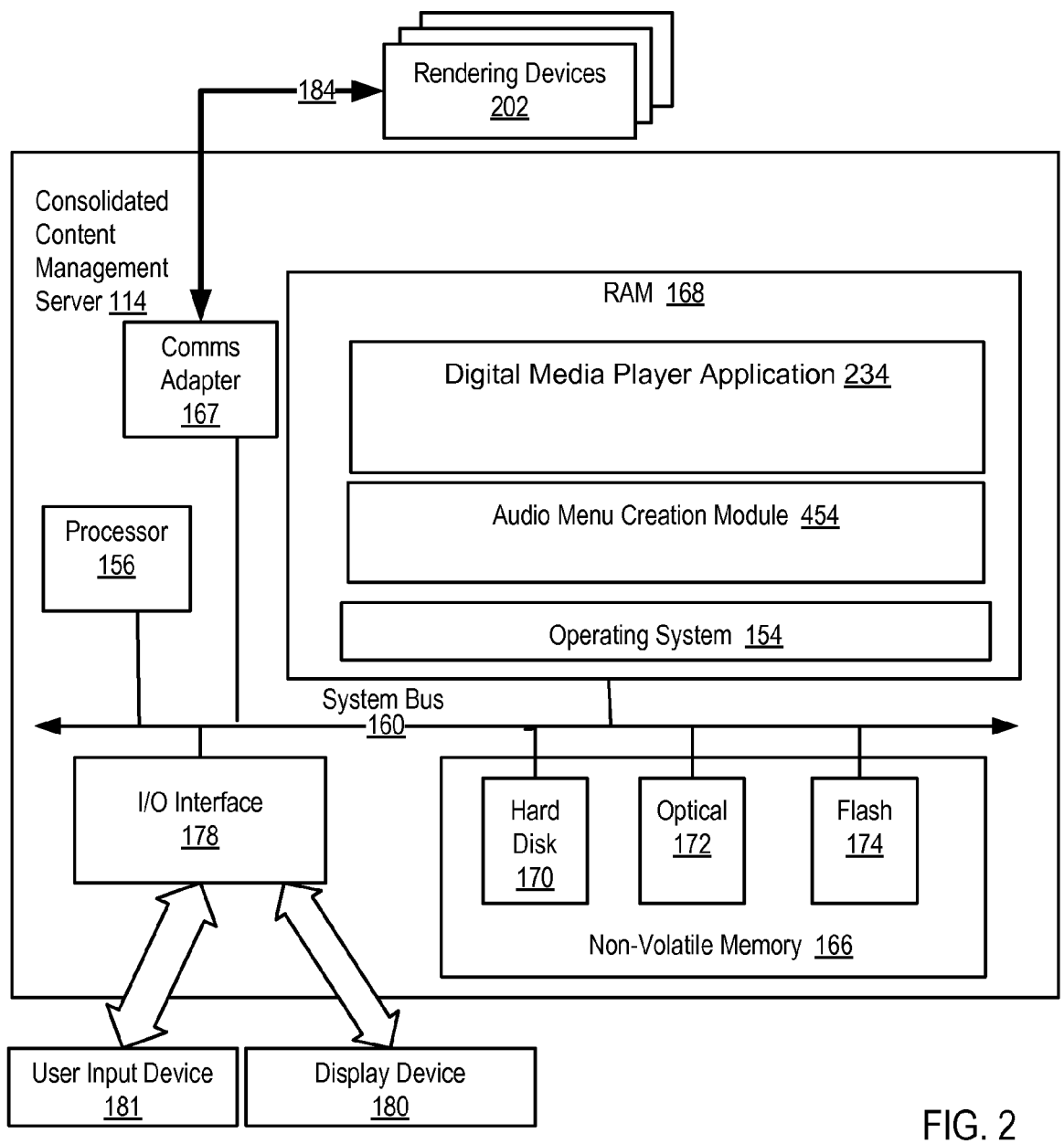
FIG. 2 sets forth a block diagram of automated computing machinery including a computer useful in creating an audio menu describing media content of a media player according to the present invention.

The exemplary computer (114) of FIG. 2 includes non-volatile computer memory (166) coupled through a system bus (160) to a processor (156) and to other components of the computer (114). Non-volatile computer memory (166) may be implemented as a hard disk drive (170), an optical disk drive (172), an electrically erasable programmable read-only memory space (so-called 'EEPROM' or 'Flash' memory) (174), RAM drives (not shown), or as any other kind of computer memory as will occur to those of skill in the art.

The exemplary computer (114) of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (114) of FIG. 2 includes a communications adapter (167) for implementing data communications (184) with rendering devices (202). Such data communications may be carried out serially through RS-232 connections, through external buses such as a USB, through data communications networks such as IP networks, and in other ways as will occur to those of skill in the art. Communications adapters implement the hardware level of data communications through which one computer sends data communications to another computer, directly or through a network. Examples of communications adapters useful for creating an audio menu describing media content of a media player include modems for wired dial-up communications, Ethernet (IEEE 802.3) adapters for wired network communications, and 802.11b adapters for wireless network communications and other as will occur to those of skill in the art.

Figure 3:
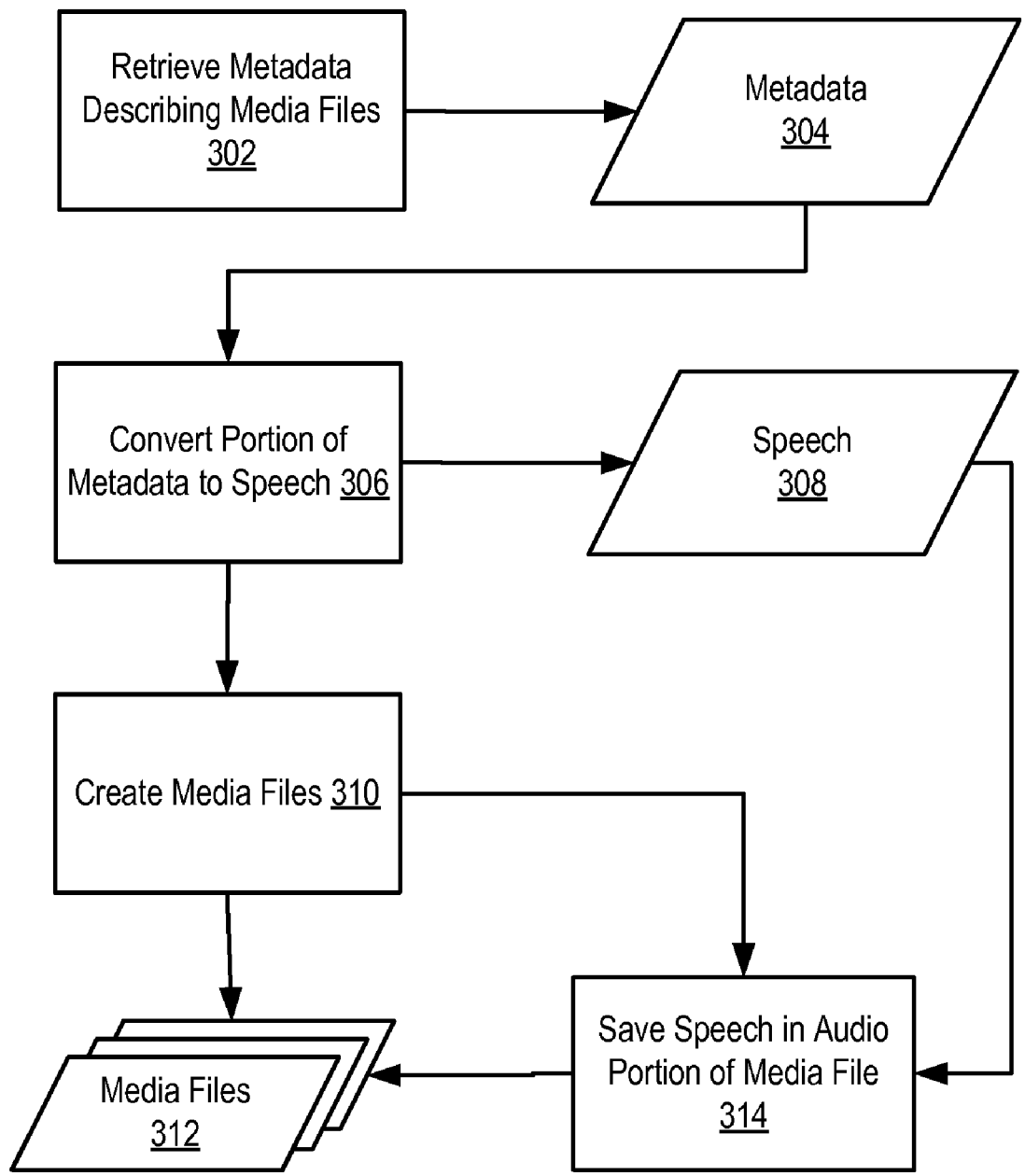
FIG. 3 sets forth a flow chart illustrating an exemplary method for creating an audio menu describing media content of a media player.

For further explanation, FIG. 3 sets forth a flow chart illustrating an exemplary method for creating an audio menu describing media content of a media player. The method of FIG. 3 includes retrieving (302) metadata (304) describing the media files managed by the media player as discussed below with reference to FIG. 4. Retrieving (302) metadata (304) describing the media files managed by the media player according to the method of FIG. 3 may be carried out by retrieving a metadata file describing the media files. iTunes®, for example, maintains an eXtensible Markup Language ('XML') library file describing the media files managed by iTunes®.

Retrieving (302) metadata (304) describing the media files managed by the media player alternatively may be carried out by individually retrieving metadata describing each media file from each of the media files managed by the media player themselves as discussed below with reference to FIG. 5. Some media file formats, such as for example, the MPEG file format, provide a portion of the file for storing metadata. MPEG file formats support, for example, an ID3v2 tag prepended to the audio portion of the file for storing metadata describing the file.

The method of FIG. 3 also includes converting (306) at least a portion of the metadata (304) to speech (308). Converting (306) at least a portion of the metadata (304) to speech (308) may be carried out by processing the extracted metadata using a text-to-speech engine in order to produce a speech presentation of the extracted metadata and then recording the speech produced by the text-speech-engine in the audio portion of a media file.

Examples of speech engines capable of converting at least a portion of the metadata to speech for recording in the audio portion of a media filed include, for example, IBM's ViaVoice Text-to-Speech, Acapela Multimedia TTS, AT&T Natural Voices™ Text-to-Speech Engine, and Python's pyTTS class. Each of these text-to-speech engines is composed of a front end that takes input in the form of text and outputs a symbolic linguistic representation to a back end that outputs the received symbolic linguistic representation as a speech waveform.

Typically, speech synthesis engines operate by using one or more of the following categories of speech synthesis: articulatory synthesis, formant synthesis, and concatenative synthesis. Articulatory synthesis uses computational biomechanical models of speech production, such as models for the glottis and the moving vocal tract. Typically, an articulatory synthesizer is controlled by simulated representations of muscle actions of the human articulators, such as the tongue, the lips, and the glottis. Computational biomechanical models of speech production solve time-dependent, 3-dimensional differential equations to compute the synthetic speech output. Typically, articulatory synthesis has very high computational requirements, and has lower results in terms of natural-sounding fluent speech than the other two methods discussed below.

Formant synthesis uses a set of rules for controlling a highly simplified source-filter model that assumes that the glottal source is completely independent from a filter which represents the vocal tract. The filter that represents the vocal tract is determined by control parameters such as formant frequencies and bandwidths. Each formant is associated with a particular resonance, or peak in the filter characteristic, of the vocal tract. The glottal source generates either stylized glottal pulses for periodic sounds and generates noise for aspiration. Formant synthesis generates highly intelligible, but not completely natural sounding speech. However, formant synthesis has a low memory footprint and only moderate computational requirements.

Concatenative synthesis uses actual snippets of recorded speech that are cut from recordings and stored in an inventory or voice database, either as waveforms or as encoded speech. These snippets make up the elementary speech segments such as, for example, phones and diphones. Phones are composed of a vowel or a consonant, whereas diphones are composed of phone-to-phone transitions that encompass the second half of one phone plus the first half of the next phone. Some concatenative synthesizers use so-called demi-syllables, in effect applying the diphone method to the time scale of syllables. Concatenative synthesis then strings together, or concatenates, elementary speech segments selected from the voice database, and, after optional decoding, outputs the resulting speech signal. Because concatenative systems use snippets of recorded speech, they have the highest potential for sounding like natural speech, but concatenative systems require large amounts of database storage for the voice database.

The method of FIG. 3 also includes creating (310) one or more media files (312) for the audio menu and saving (314) the speech (308) in the audio portion of the one or more the media files (312) for the audio menu. Examples of media file formats useful in creating an audio menu describing media content of a media player according to the present invention include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art. To further aid users of audio menus according to the present invention some embodiments also include prepending speech converted from the metadata of a media file managed by the media player to the audio portion of the media file. Prepending speech converted from the metadata of a media file managed by the media player to the audio portion of the media file provides additional functionality to each media file managed by the media player and advantageously provides a speech description of the media file prior to the content of the media file itself. This speech description of the media file prepended to the audio content allows users to determine whether to play the content from the speech description of the content.

As discussed above, retrieving metadata describing the media files managed by the media player may be carried out by retrieving a metadata file describing the media files. For further explanation, therefore, FIG. 4 sets forth a flow chart illustrating another exemplary method for creating an audio menu describing media content of a media player that includes retrieving a metadata file describing the media files managed by the media player. The method of FIG. 4 is similar to the method of FIG. 3 in that the method of FIG. 4 includes retrieving (302) metadata (304) describing the media files managed by the media player; converting (306) at least a portion of the metadata (304) to speech (308); creating (310) one or more media files (312) for the audio menu; and saving (314) the speech (308) in the audio portion of the one or more the media files (312) for the audio menu.

Figure 4:
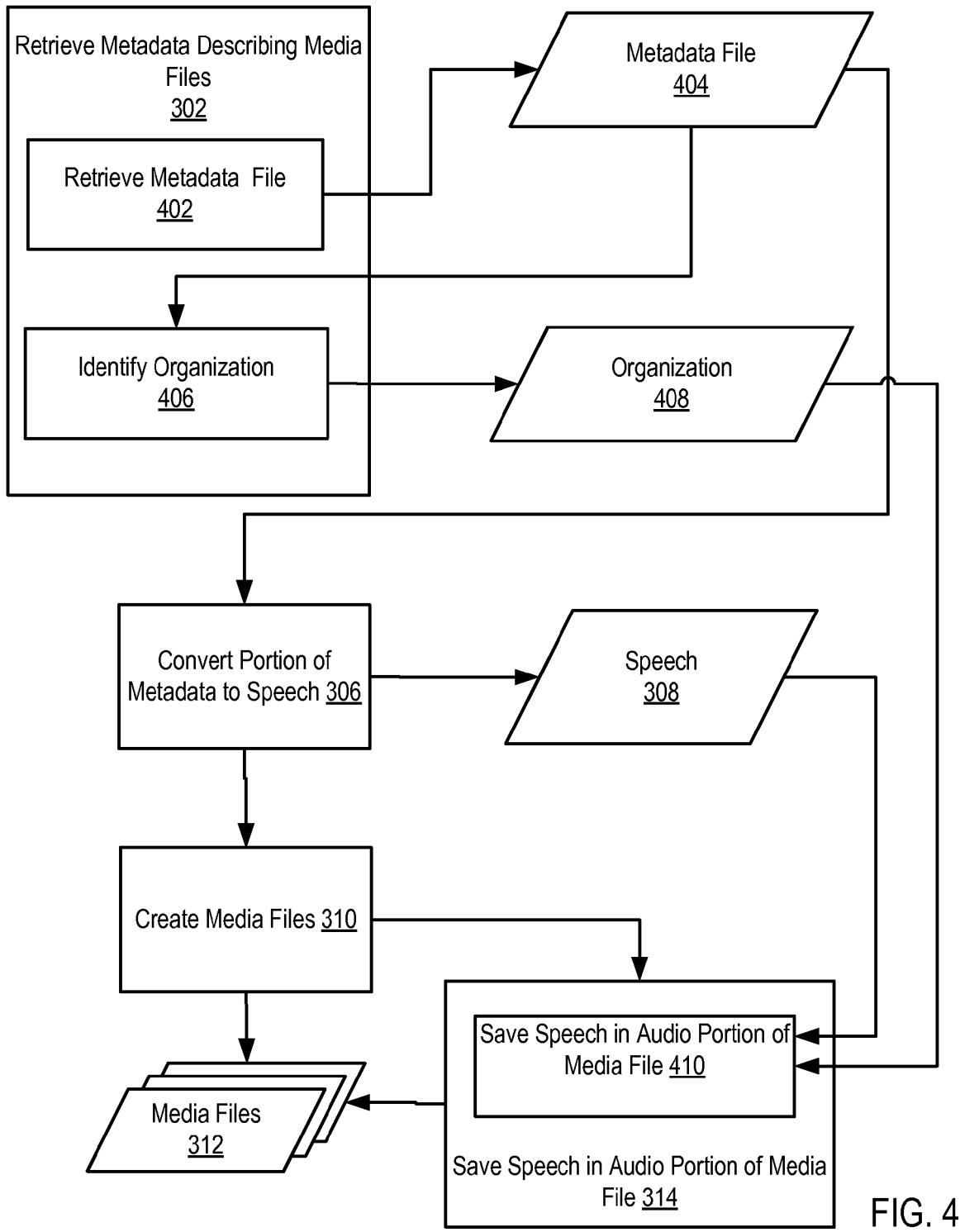
FIG. 4 sets forth a flow chart illustrating another exemplary method for creating an audio menu describing media content of a media player that includes retrieving a metadata file describing the media files managed by the media player.

In the method of FIG. 4, retrieving (302) metadata includes retrieving (402) a metadata file (404) describing the media files managed by the media player. As mentioned above, one example of such a metadata file is an eXtensible Markup Language ('XML') library file describing the media files managed by iTunes®.

In the method of FIG. 4, retrieving (302) metadata also includes identifying (406) in dependence upon the metadata file (404) an organization (408) of the media files managed by the media player. Identifying (406) in dependence upon the metadata file (404) an organization (408) of the media files managed by the media player may include determining a logical structure, such as for example a tree structure, of the organization of the media files, identifying playlists, determining the organization of media files by artist or genre, or any other organization of the media files as will occur to those of skill in the art. Identifying (406) in dependence upon the metadata file (404) an organization (408) of the media files managed by the media player may be carried out by parsing the markup of an metadata file such as, for example, the XML library file describing the media files managed by iTunes® to determine a logical structure of the organization of the media files, to identify playlists, to determine any organization of media files by artist or genre, or any other organization of the media files as will occur to those of skill in the art In the method of FIG. 4, saving (314) the speech (308) in the audio portion of the one or more the media files (312) for the audio menu also includes saving (410) the speech (308) according to the organization (408) of the media files (502) managed by the media player. Saving (410) the speech (308) according to the organization (408) of the media files (502) managed by the media player according to the method of FIG. 4 may be carried out by saving the speech in a logical sequence corresponding with any logical structure of the organization of the media files, identified playlists, organization of media files by artist or genre, or any other organization of the media files as will occur to those of skill in the art.

As discussed above, retrieving metadata describing the media files managed by a media player may also include individually retrieving metadata describing each media file from each of the media files managed by the media player themselves. For further explanation, therefore, FIG. 5 sets forth a flow chart illustrating another exemplary method for creating an audio menu describing media content of a media player. The method of FIG. 5 is similar to the methods of FIG. 3 and FIG. 4 in that the method of FIG. 5 also includes retrieving (302) metadata (304) describing the media files managed by the media player; converting (306) at least a portion of the metadata (304) to speech (308); creating (310) one or more media files (312) for the audio menu; and saving (314) the speech (308) in the audio portion of the one or more the media files (312) for the audio menu. In the method of FIG. 5, however, retrieving (302) metadata includes retrieving (506) from each of the media files (502) managed by the media player metadata (508) describing the media file (502). As described above, some media file formats, such as for example, the MPEG file format, provide a portion of the file for storing metadata. MPEG file formats support, for example, an ID3v2 tag prepended to the audio portion of the file for storing metadata describing the file. Retrieving (506) from each of the media files (502) managed by the media player metadata (508) describing the media file (502), for example, therefore may be carried out by retrieving metadata from an ID3v2 tag or other header or container for metadata of each of the media files managed by the media player.

Figure 5:
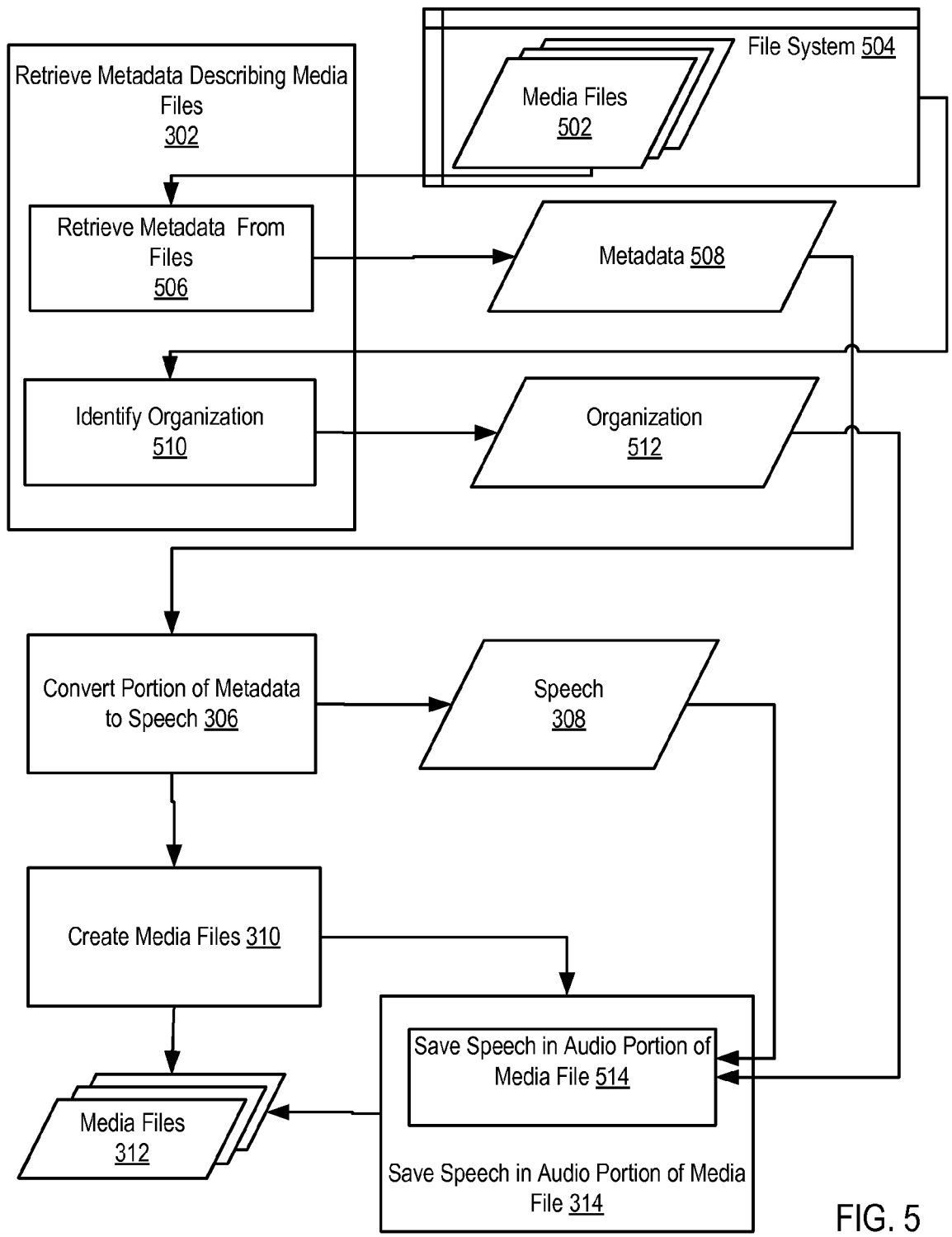
FIG. 5 sets forth a flow chart illustrating another exemplary method for creating an audio menu describing media content of a media player.

Creating an audio menu describing media content of a media player according to the method of FIG. 5 also includes identifying (510) in dependence upon a file system (504) in which the media files (502) are stored an organization (512) of the media files (502) managed by the media player. Identifying (510) in dependence upon a file system (504) in which the media files (502) are stored an organization (512) of the media files (502) managed by the media player may be carried out by identifying in dependence upon the logical tree structure of the file system (504) an organization of the media files representing that logical structure of the files system. Such an organization may provide for playlists, organization of media files by artist or genre, or other organization by logical structure in a file system.

In the method of FIG. 5, saving (314) the speech (308) in the audio portion of the one or more the media files (312) for the audio menu also includes saving (514) the speech (308) according to the organization (512) of the media files (502) managed by the media player. Saving (514) the speech (308) according to the organization (512) of the media files (502) managed by the media player according to the method of FIG. 5 may be carried out by saving the speech in a logical sequence corresponding with the identified logical structure of the file system of the media files.

As an aid to users of audio menus according to the present invention, some embodiments of the present invention also include providing not only a description of the media files managed by the media player, but also a description of the organization of those media files such that a user may be informed of the organization of the media files empowering the user to navigate the media files using the audio menu. For further explanation, FIG. 6 sets forth a flow chart illustrating an exemplary method for creating an audio file organization menu including identifying (602) an organization (604) of the media files managed by the media player and creating (606) speech (608) describing the organization (604) of the media files managed by the media player. Identifying (602) an organization of the media files may be carried out by in dependence upon a metadata file as described above with reference to FIG. 4 or in dependence upon the logical organization of the media files in a file system as described above with reference to FIG. 5 or in other ways as will occur to those of skill in the art. Creating (606) speech (608) describing the organization (604) of the media files managed by the media player may be carried out a speech synthesis engine to create speech describing the identified organization (604) as discussed above.

Figure 6:
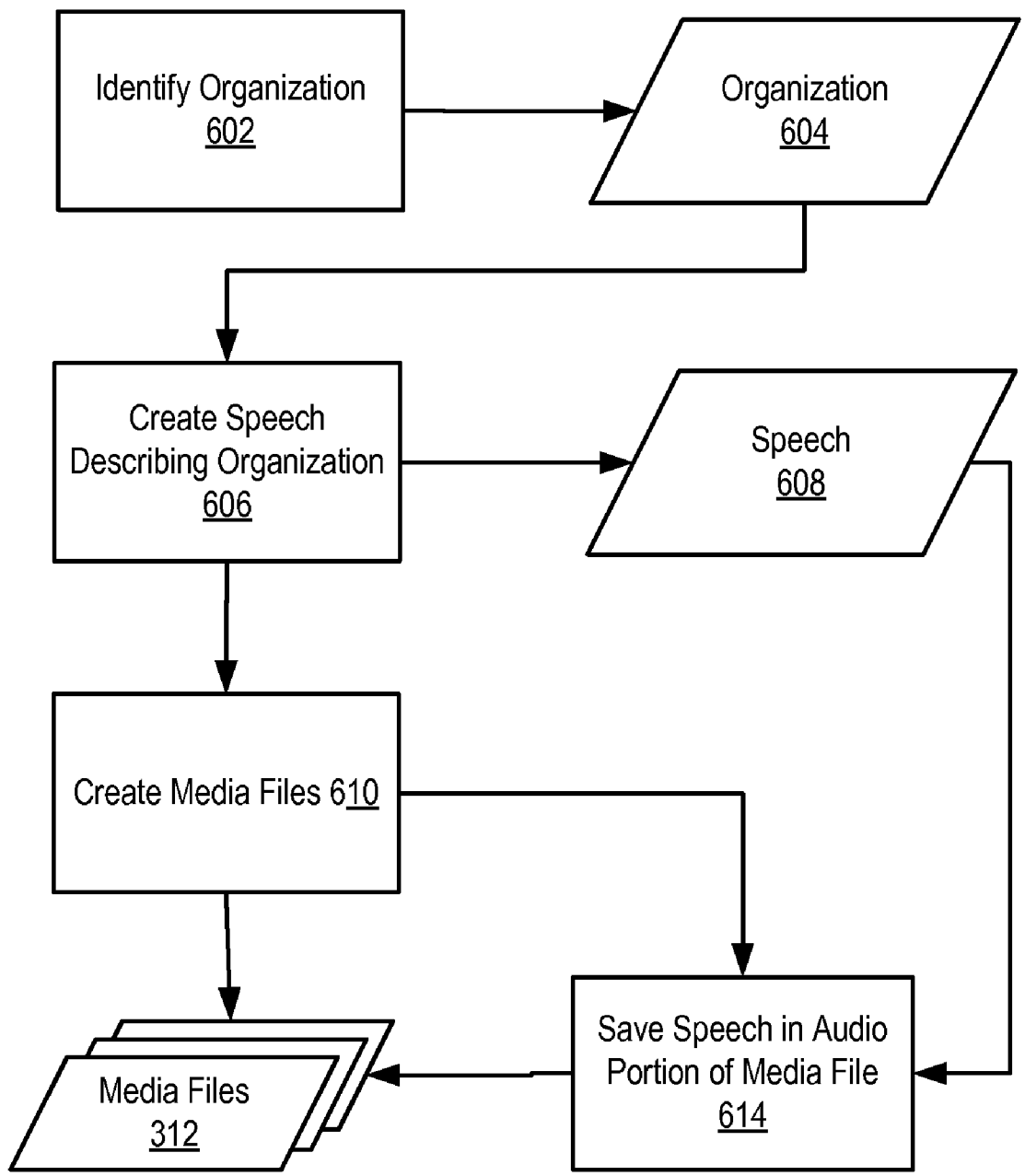
FIG. 6 sets forth a flow chart illustrating an exemplary method for creating an audio file organization menu.

The method of FIG. 6 also includes creating (610) one or more media files (312) and saving (614) the created speech (608) describing the organization (604) of the media files managed by the media player in the one or more media files (312). Examples of media files useful in creating an audio menu describing media content of a media player according to the present invention include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art.

Exemplary embodiments of the present invention are described largely in the context of a fully functional computer system for creating an audio menu describing media content of a media player. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for creating an audio menu describing media content of a media player, the method comprising:
retrieving metadata describing the media files managed by the media player, further comprising:
retrieving an extensible markup language ('XML') metadata file describing the media files managed by the media player;
identifying in dependence upon the XML metadata file an organization of the media files managed by the media player;
converting at least a portion of the metadata to speech, including converting metadata describing a particular media file managed by media player to speech;
creating one or more media files for the audio menu; and
saving the speech in the audio portion of the one or more media files for the audio menu, further comprising saving the speech according to the organization of the media files managed by the media player.

2. The method of claim 1 wherein retrieving metadata further comprises:
retrieving from each of the media files managed by the media player metadata describing the media file;
identifying in dependence upon a file system in which the media files are stored an organization of the media files managed by the media player; and
wherein saving the speech in the audio portion of the one or more media files for the audio menu further comprises:
saving the speech according to the organization of the media files managed by the media player.

3. The method of claim 2 further comprising prepending speech converted from the metadata of a media file managed by the media player to the audio portion of the media file.

4. The method of claim 1 further comprising creating an audio file organization menu including:
identifying an organization of the media files managed by the media player;
creating speech describing the organization of the media files managed by the media player; and
creating one or more media files; and
saving the created speech describing the organization of the media files managed by the media player in the one or more media files.

5. A system for creating an audio menu describing media content of a media player, the system comprising:
a computer processor;
a computer memory operatively coupled to the computer processor;
the computer memory having disposed within it computer program instructions capable of:
retrieving metadata describing the media files managed by the media player, further comprising:
retrieving an extensible markup language ('XML') metadata file describing the media files managed by the media player;
identifying in dependence upon the XML metadata file an organization of the media files managed by the media player;
converting at least a portion of the metadata to speech including converting metadata describing a particular media file managed by media player to speech;
creating one or more media files for the audio menu; and
saving the speech in the audio portion of the one or more media files for the audio menu, further comprising saving the speech according to the organization of the media files managed by the media player.

6. The system of claim 5 wherein computer program instructions capable of retrieving metadata further comprise computer program instructions capable of:
> retrieving from each of the media files managed by the media player metadata describing the media file;
> identifying in dependence upon a file system in which the media files are stored an organization of the media files managed by the media player; and
> wherein computer program instructions capable of saving the speech in the audio portion of the one or more media files for the audio menu further comprise computer program instructions capable of:
> saving the speech according to the organization of the media files managed by the media player.

7. The system of claim 6 wherein the computer memory also has disposed with it computer program instructions capable of prepending speech converted from the metadata of a media file managed by the media player to the audio portion of the media file.

8. The system of claim 5 wherein the computer memory also has disposed with it computer program instructions capable of creating an audio file organization menu including computer program instructions capable of:
> identifying an organization of the media files managed by the media player;
> creating speech describing the organization of the media files managed by the media player; and
> creating one or more media files; and
> saving the created speech describing the organization of the media files managed by the media player in the one or more media files.

9. A computer program product for creating an audio menu describing media content of a media player, the computer program product embodied on a computer-readable recording medium, the computer program product comprising:
> computer program instructions for retrieving metadata describing the media files managed by the media player, further comprising:
>> computer program instructions for retrieving an extensible markup language ('XML') metadata file describing the media files managed by the media player;
>> computer program instructions for identifying in dependence upon the XML metadata file an organization of the media files managed by the media player,
> computer program instructions for converting at least a portion of the metadata to speech, including computer program instructions for converting metadata describing a particular media file managed by media player to speech;
> computer program instructions for creating one or more media files for the audio menu; and
> computer program instructions for saving the speech in the audio portion of the one or more media files for the audio menu, further comprising computer program instructions for saving the speech according to the organization of the media files managed by the media player.

10. The computer program product of claim 9 wherein computer program instructions for retrieving metadata further comprise:
> computer program instructions for retrieving from each of the media files managed by the media player metadata describing the media file;
> computer program instructions for identifying in dependence upon a file system in which the media files are stored an organization of the media files managed by the media player, and
> wherein computer program instructions for saving the speech in the audio portion of the one or more media files for the audio menu further comprise:
> computer program instructions for saving the speech according to the organization of the media files managed by the media player.

11. The computer program product of claim 10 further comprising computer program instructions for prepending speech converted from the metadata of a media file managed by the media player to the audio portion of the media file.

12. The computer program product of claim 9 further comprising computer program instructions for creating an audio file organization menu including:
> computer program instructions for identifying an organization of the media files managed by the media player;
> computer program instructions for creating speech describing the organization of the media files managed by the media player; and
> computer program instructions for creating one or more media files; and
> computer program instructions for saving the created speech describing the organization of the media files managed by the media player in the one or more media files.

* * * * *